(12) United States Patent
Tastl et al.

(10) Patent No.: US 9,049,405 B2
(45) Date of Patent: Jun. 2, 2015

(54) SOFT PROOFING SYSTEM

(75) Inventors: Ingeborg Tastl, San Mateo, CA (US);
Eric Hoarau, San Francisco, CA (US);
Ehud Chatow, Palo Alto, CA (US);
Steven J Simske, Fort Collins, CO (US);
John Ludd Recker, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 13/563,100

(22) Filed: Jul. 31, 2012

(65) Prior Publication Data

US 2014/0036283 A1    Feb. 6, 2014

(51) Int. Cl.
*G06F 15/00* (2006.01)
*H04N 1/60* (2006.01)

(52) U.S. Cl.
CPC ........................................ *H04N 1/60* (2013.01)

(58) Field of Classification Search
None
See application file for complete search history.

(56) References Cited

U.S. PATENT DOCUMENTS

| | | | |
|---|---|---|---|
| 6,014,457 A * | 1/2000 | Kubo et al. | 382/167 |
| 6,738,155 B1 | 5/2004 | Rosenlund et al. | |
| 2003/0122806 A1 | 7/2003 | Edge | |
| 2005/0036162 A1 | 2/2005 | Edge et al. | |
| 2005/0206925 A1 * | 9/2005 | Agehama | 358/1.9 |
| 2008/0018917 A1 * | 1/2008 | Zhang | 358/1.5 |
| 2008/0043265 A1 | 2/2008 | Kim et al. | |

OTHER PUBLICATIONS

Antonacci et al., Soft Proofing: A Guide to Benefits & Best Practices, Magazines Canada, Sep. 2008, 16 pages.
Patil et al., 3D Simulation of Prints for Improved Soft Proofing, Rochester Institute of Technology, Sep. 11, 2004, 8 pages.
International Digital Enterprise Alliance, SWOP 2007 Specs, Graphic Arts Monthly, May 2007,10 pages.
Fogra, Softproof Handbook, Fogra Graphic Technology Research Association, Jul. 2009, 43 pages.
SWOP Specifications, 10th Edition, 2005 as printed on Jul. 31, 2012, 14 pages.

* cited by examiner

*Primary Examiner* — Jeremiah Bryar
(74) *Attorney, Agent, or Firm* — Dicke, Billig

(57) ABSTRACT

A soft proof system includes a display module and a manager. The display module displays a visual representation of a print product, and a color array expressing a tolerance range of a color component of the visual representation and a target color within the range. Via the manager, a visualization function produces the visual representation and the color array according to a soft proof array. A tolerance selection function, associated with the display module, enables selection of the tolerance range for at least a portion of the print product, wherein the selection is expressed on the display in the visual representation and in the color array.

23 Claims, 9 Drawing Sheets

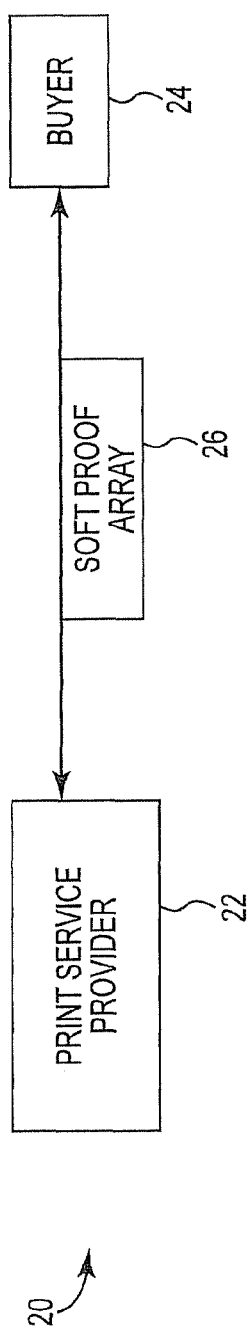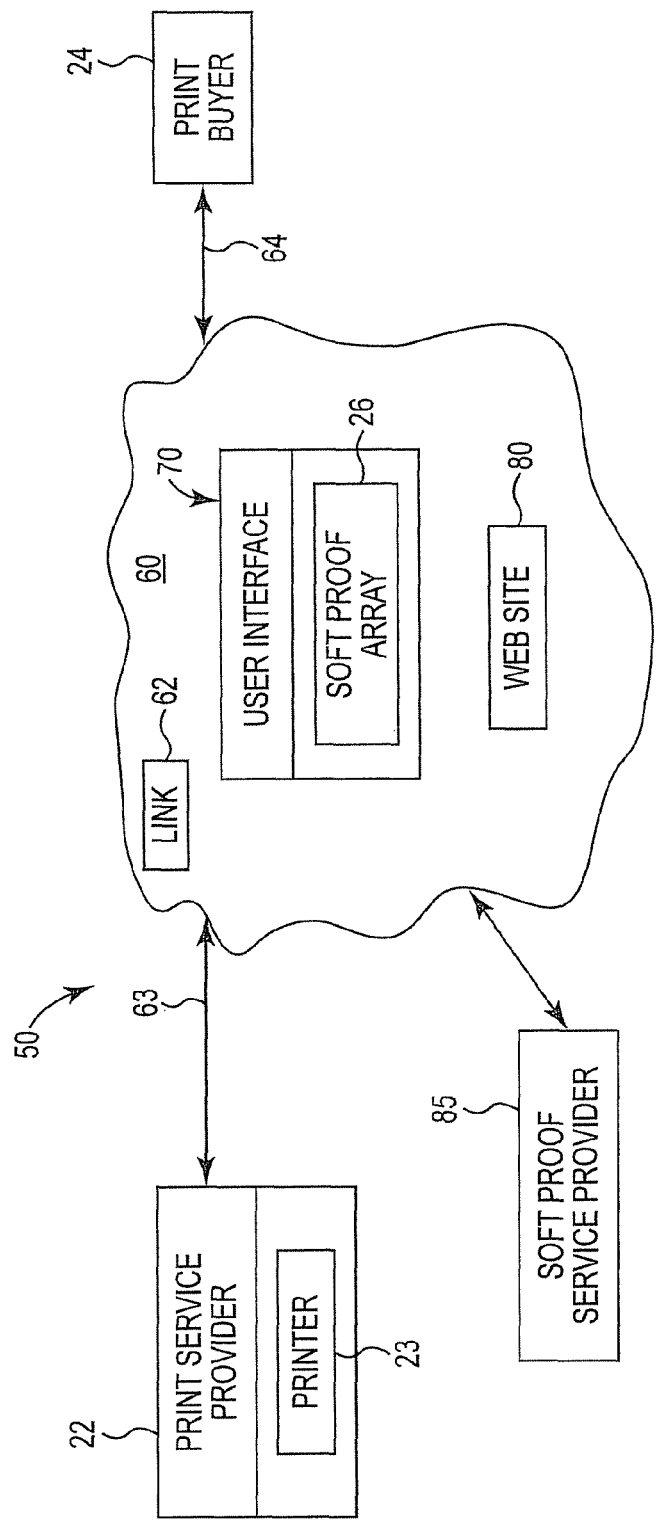

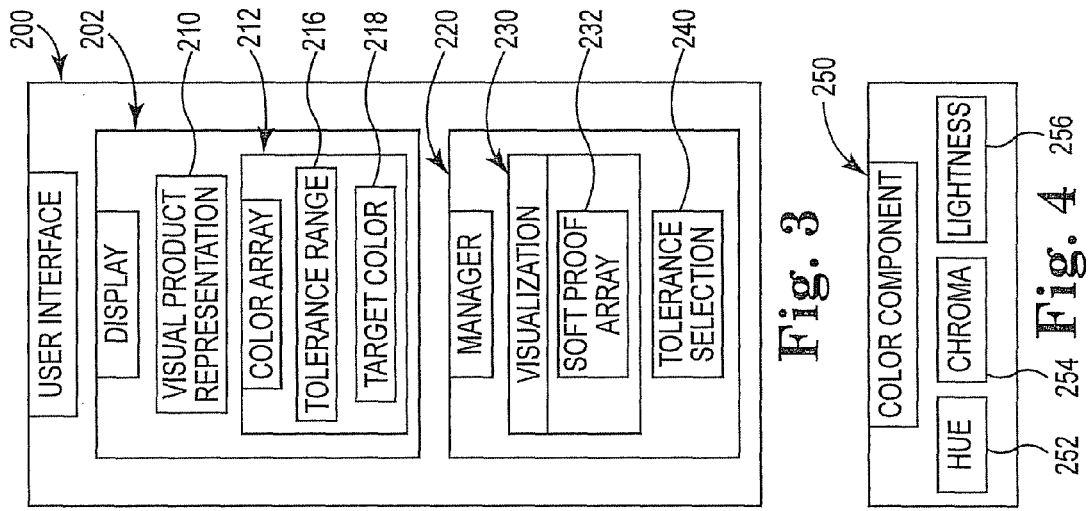
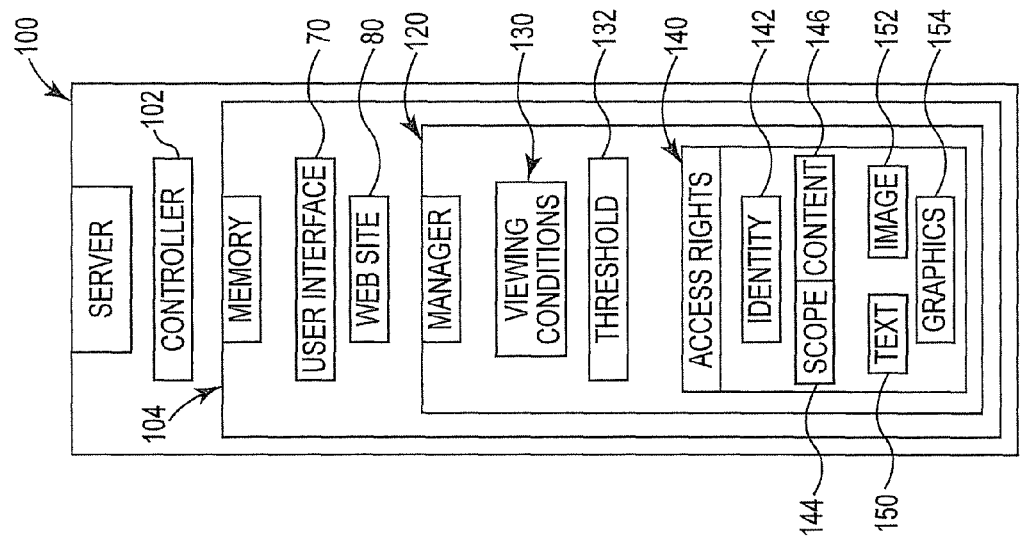

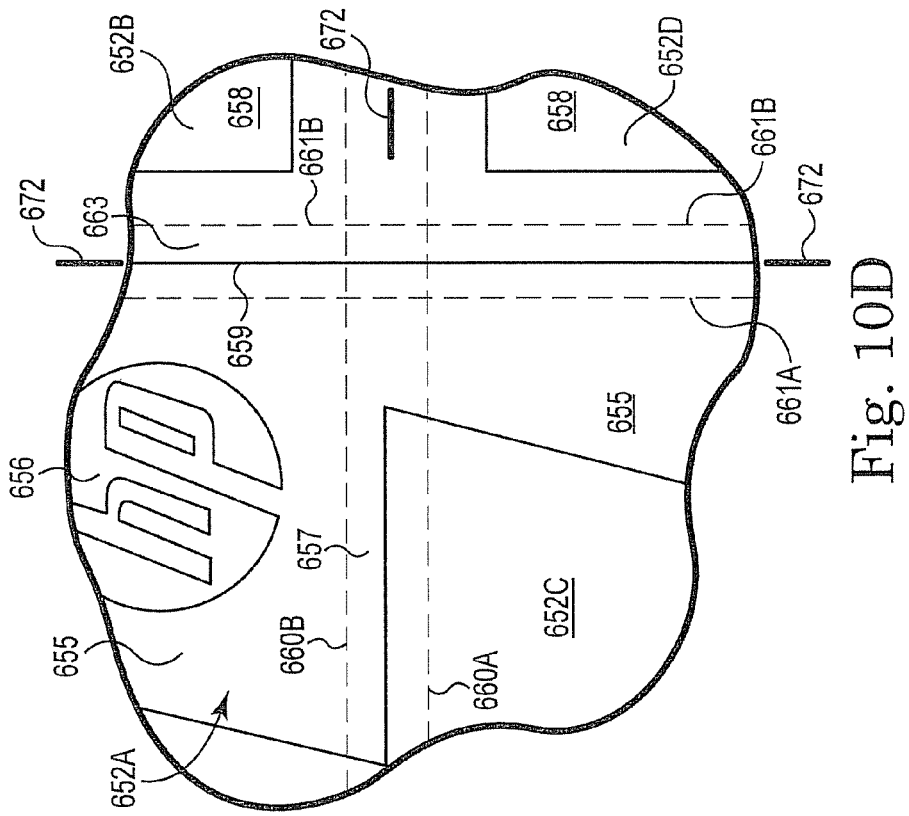
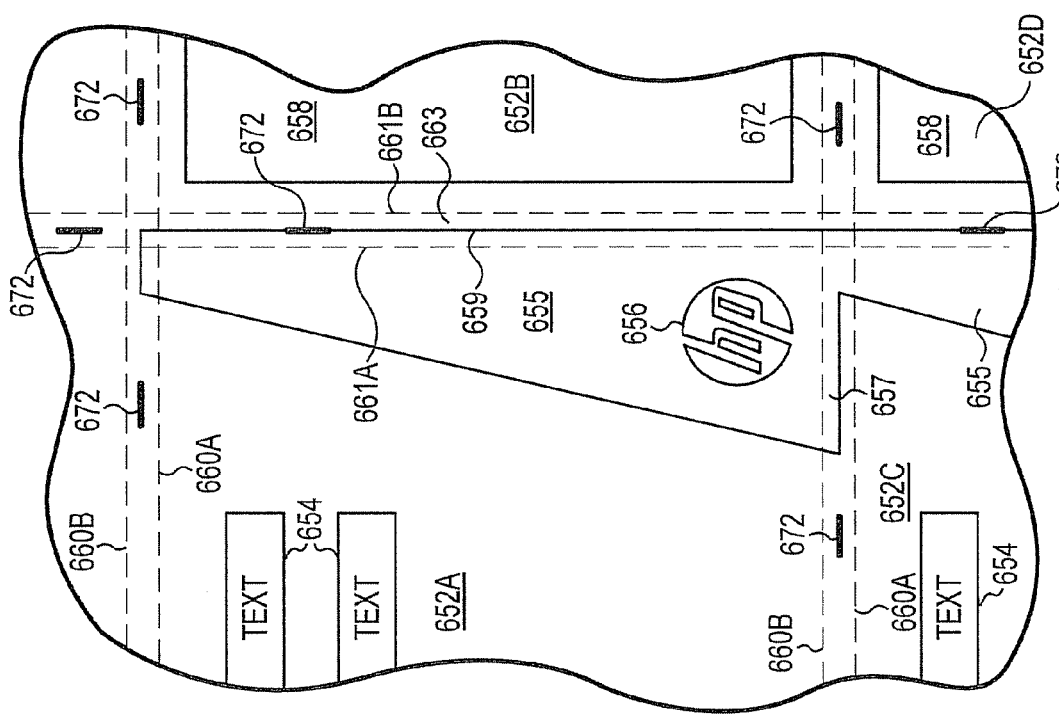
Fig. 10D
Fig. 10C

SOFT PROOFING SYSTEM

BACKGROUND

Proofing plays a significant role in the printing industry. Traditional hard-copy proofs involve a time-consuming, expensive process aimed at avoiding mistakes in a formal printing run. Soft proofs are one technique by which many attempts have been made at reducing the complication and time spent associated with traditional hard-copy proofs. In one example, a traditional soft proof involves remotely viewing a sample page of a print product via an electronic display.

BRIEF DESCRIPTION OF THE DRAWINGS

FIG. 1A is a block diagram schematically illustrating a soft proofing system, according to one example of the present disclosure.

FIG. 1B is a block diagram schematically illustrating a soft proofing system, according to one example of the present disclosure.

FIG. 2 is a block diagram schematically illustrating a server of a soft proofing system, according to one example of the present disclosure.

FIG. 3 is a block diagram schematically illustrating a user interface of a soft proofing system, according to one example of the present disclosure.

FIG. 4 is a block diagram schematically illustrating a color component module, according to one example of the present disclosure.

FIG. 10 C is an enlarged view of a portion of FIG. 10B.

DETAILED DESCRIPTION

Figure 5A:
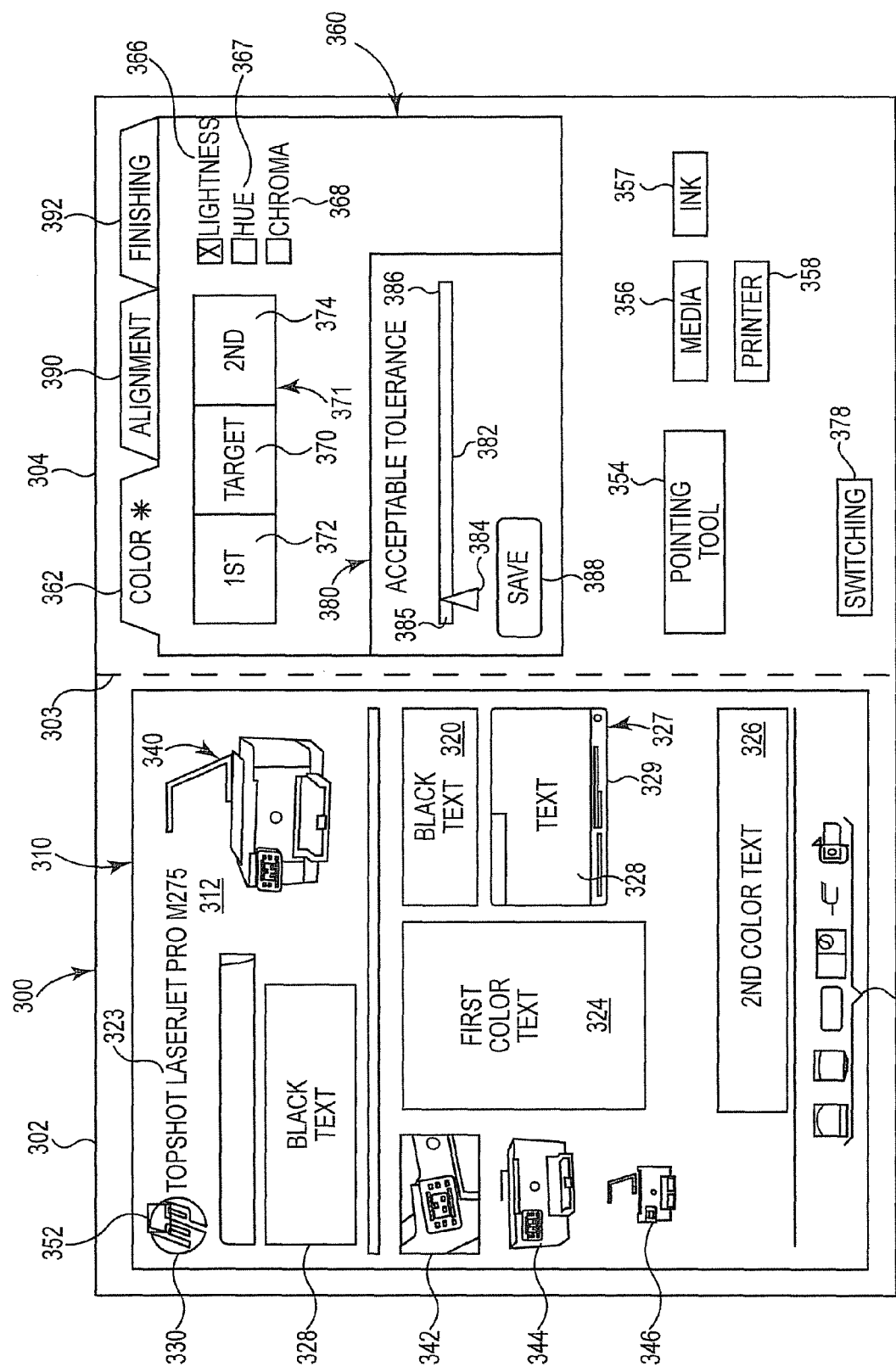
FIG. 5A is a diagram schematically illustrating a user interface, including a general display portion and a tolerance selection display-and-input portion, according to one example of the present disclosure.

In the following detailed description, reference is made to the accompanying drawings which form a part hereof, and in which is shown by way of illustration specific examples of the present disclosure which may be practiced. In this regard, directional terminology, such as "top," "bottom," "front," "back," "leading," "trailing," etc., is used with reference to the orientation of the Figure(s) being described. Because components of examples and embodiments can be positioned in a number of different orientations, the directional terminology is used for purposes of illustration and is in no way limiting. It is to be understood that other examples and embodiments may be utilized and structural or logical changes may be made without departing from the scope of the present disclosure. The following detailed description, therefore, is not to be taken in a limiting sense.

At least some examples of the present disclosure are directed to a soft proofing system that provides a visual representation of a print product according to a soft proof array, thereby enhancing a print buyer's capability to review and evaluate a soft proof of a print product. In one example, a soft proof array displays a target color (or other aspect such as alignment) while also displaying a tolerance range associated with the target color.

The soft proof array in the examples of the present disclosure stands in contrast to traditional static soft proofs that typically do not reveal the tolerances associated with the production of the print product. In particular, there will typically be some difference between the prognosticated color (target color) of an element of the print product and the color as it actually appears on the printed hard copy of a print product. Accordingly, via at least some examples of the present disclosure, the print buyer will be aware of those manufacturing tolerances, obtain a visual feedback of what those tolerances mean and to determine whether they are acceptable or not for a specific print product. In another aspect of at least some examples of the present disclosure, a print service provider enjoys a tool to communicate the manufacturing tolerances, offer different tolerances for different price points and distinguish themselves from the competition. In another aspect, the print service provider also can avoid requests for reprints due to too high color differences. When the color tolerance is small enough to be acceptable to the print buyer, it is said to fall within a tolerance range. When the difference is too large, it is said to fall outside the tolerance range.

To explain further, when considering one of the various aspects of color, such lightness (or hue or chroma), the color appearing in the actual printed product can be lighter or darker than the target color. When these differences are acceptable to the print buyer, they are said to fall within a tolerance range—a range of color difference surrounding the target color.

When using traditional soft proofs, the print buyer sometimes specifies to the print service provider a numerical indication of an acceptable tolerance range. One common numerical expression used for communicating the tolerance range is a delta E tolerance. Unfortunately, until the print buyer sees the actual printed product, the print buyer will not have a visual confirmation of whether the numerically specified tolerance results in a printed product that is close enough to the target color that the print buyer desires.

On the other hand, via the soft proof array in accordance with examples of the present disclosure, a displayed tolerance range provides a visual picture of each end of the acceptable range of color difference surrounding the target color. In addition to being able to visually evaluate the tolerance range via the soft proof array, the system equips the buyer to modify and view adjustments to the tolerance range before approving the soft proof array. However, it will be understood that the tolerance range that can be set by the print buyer is not arbitrary but would correspond to tolerances that are achievable by a manufacturing process available to the print service provider. Because each print service provider will have different manufacturing capabilities, a certain tolerance range would not be achievable by a first print service provider, but would be achievable by a second print service provider that has a superior color process control. In this way, whether or not a particular print service provider can meet the desired tolerance range set by the print buyer might determine which print service provider is selected to receive a contract for producing the print product that is the subject of the soft proof array, in accordance with examples of the present disclosure.

Accordingly, the print buyer is able to confidently agree to potential variances from the target color prior to seeing the actual printed product. Moreover, by providing a visual tolerance range as part of the soft proof array, in accordance with at least some examples of the present disclosure, the print service provider fulfilling the order will be able to evaluate the actual printed product and be confident of meeting the requirements of the contract when the soft proof array forms part of the contract between the print buyer and the print service provider.

In at least some examples, a soft proofing system includes a user interface comprising a display module and a manager. The display module displays a visual representation of a print product and displays a color array expressing a tolerance range of a color component of the visual representation. The manager includes a visualization function and a tolerance selection function. The visualization function produces the visual representation and the viewable color array according to a soft proof array. The tolerance selection function associated with the display enables selection of the tolerance range for at least a portion of the print product, wherein the selection is expressed on the display in the visual representation and in the color array. In one aspect, the selection is stored in the soft proof array and travels with the soft proof array. Accordingly, via the soft proof array, print buyers are empowered to evaluate a soft proof in a broader context. In particular, upon viewing the soft proof array, a print buyer is able to see a tolerance range established for color components and/or for spatial-structural components. This ability produces at least two results. First, a buyer can better judge the proposed soft proof because the buyer can preview what a range of possible outcomes might look like. Second, via the soft proof array, the buyer is able to adjust the tolerance range, and immediately see what the new range of outcomes might look like. In this way, reviewing a soft proof array becomes an interactive and dynamic process. Moreover, instead of the traditional soft proof (which provides a static representation of one possible outcome at the printer), a soft proof array in accordance with example of the present disclosure provides a dynamic representation of a likely range of outcomes. Accordingly, a soft proof array communicates information in an effective way that is currently not available in traditional soft proofs.

Moreover, in some examples of the present disclosure, the soft proof system provides direct assistance to a print buyer instead of leaving the print buyer to themselves to evaluate their print product according to a soft proof. In particular, in one example, the soft proof system includes a recommendation module, which analyzes the current soft proof and makes recommendations regarding aspects of the to-be-printed document (e.g. print product) that can be improved. These recommendations can relate to a color component and/or a spatial-structural component of a print product. Moreover, in some examples, upon consent by the print buyer, the analysis module can implement the appropriate modifications to the to-be-printed document (e.g. print product).

These examples and additional examples and embodiments are described further in association with FIGS. 1A-11.

FIG. 1A is a block diagram schematically illustrating a soft proofing system 20, according to an example of the present disclosure. As shown in FIG. 1A, soft proof system 20 includes a print service provider 22, a print buyer 24, and a soft proof array 26. As shown in FIG. 1A, the soft proof array 26 is communicated between the print service provider 22 and the print buyer 24.

In general terms, a print buyer 24 seeks to obtain printing services from print service provider 22, such as printing of a particular print product. However, prior to performing the print job, the print service provider 22 and print buyer 24 use a soft proof array 26 as a basis to agree on what the final print product should look like before print service provider 22 commences with formal printing of the print product. In one aspect, the soft proof array 26 provides a soft proof via an array of information about the tolerance range of color components and/or spatial-structural components of print product. Unlike traditional static soft proofs, the soft proof array 26 in examples of the present disclosure provides a dynamic mechanism for a print buyer 24 to evaluate a soft proof offered by the print service provider 22 and for the print buyer 24 to communicate their acceptance of the offered soft proof. In addition, the soft proof array in examples of the present disclosure enables the print buyer 24 to communicate desired changes (regarding the soft proof array) to the print service provider 22, as further described below.

FIG. 1B is a block diagram of a soft proofing system 50, according to one example of the present disclosure. As shown in FIG. 1B, print service provider 22 and print buyer 24 communicate with each other via cloud 60, along the respective communication paths 63, 64. In one example, the cloud 60 represents a network communication link 62 such as the internet, other network-based communication protocols, mobile telecommunication networks, local area networks (LAN), wide area networks (WAN), etc.

In one example, buyer 24 participates in system 50 via a computer (e.g. laptop, desktop, etc.), a mobile computing device (e.g. smartphone, tablet, etc.), and like devices capable of communicating via cloud 60. The buyer 24 can be an individual consumer, a business or other entity. For example, in some instances, buyer 24 is another print service provider that seeks to outsource portions of a print job for which the particular print service provider lacks the appropriate type of resources to perform and/or for which the particular print service provider does not have the capacity to handle in a particular time frame. It will be further understood that system 50 can handle multiple buyers 24 operating in parallel with each buyer 24 independently communicating with a print service provider 22 regarding their own respective print products.

In one example, print service provider 22 includes an entity owning and/or operating a print shop having printers 23 and related devices for producing a print product requested by buyer 24. In one aspect, the print services include printing, copying, finishing, assembly, delivery, shipping and related tasks. In one aspect, print service provider 22 operates a publically accessible portal, such as a web site 80 through which the buyer 24 and a print service provider 22 can communicate with each other via the cloud 60.

In one example, system 50 includes a soft proof service provider 85 who is a third party relative to buyer 24 and print service provider 22. In one aspect, soft proof service provider 85 does not provide its own printing services to buyer 24.

Instead, soft proof service provider 85 provides and operates user interface 70 and/or web site 80, and print service provider 24 contracts with soft proof service provider 85 to enable print buyers 24 to communicate with print service provider 22 via the user interface 70 and/or web site 80.

In one example, a print product includes a book, magazine, booklet or pamphlet while in some other examples, a print product includes a container (e.g. a box), signage, beverage containers (e.g. a bottle), etc. Accordingly, in at least some examples of the present disclosure, a print product is not strictly limited to books and similar articles. In at least some instances, the print product exhibits some three-dimensionality in form.

FIG. 2 is a block diagram of a server 100 associated with at least one of print service provider 22 (FIG. 1B) and/or soft proof service provider 85 (FIG. 1B), according to an example of the present disclosure.

As shown in FIG. 2, in one example server 100 includes a controller 102 and memory 104. In one example, memory 104 stores user interface 70, web site 80, and a manager 120.

In one example, controller 102 comprises at least one processor and associated memories to generate control signals directing operation of at least some components of system 20 of FIG. 1A and/or server 100 of FIG. 2. In particular, in response to or based upon commands received via a user interface 70 and/or machine readable instructions (including software) contained in the memory 104 associated with controller 102, controller 102 generates control signals directing operation of server 100 shown in FIG. 2. In one example, controller 102 is embodied in a general purpose computer.

For purposes of this application, in reference to the controller 102, the term "processor" shall mean a presently developed or future developed processor (or processing resources) that executes sequences of machine readable instructions (such as but not limited to software) contained in a memory. Execution of the sequences of machine readable instructions causes the processor to perform actions, such as operating server 100 to provide printing services by print service provider 22 and/or soft proof service provider 85 in the manner described in the examples of the present disclosure. The machine readable instructions may be loaded in a random access memory (RAM) for execution by the processor from their stored location in a read only memory (ROM), a mass storage device, or some other persistent storage or non-volatile form of memory, as represented by memory 104. In one example, memory 104 comprises a computer readable medium providing non-volatile storage of the machine readable instructions executable by a process of controller 102. In other examples, hard wired circuitry may be used in place of or in combination with machine readable instructions (including software) to implement the functions described. For example, controller 102 may be embodied as part of at least one application-specific integrated circuit (ASIC). In at least some examples, the controller 102 is not limited to any specific combination of hardware circuitry and machine readable instructions (including software), nor limited to any particular source for the machine readable instructions executed by the controller 102.

In one example, user interface 70 comprises a graphical user interface or other display that provides for the simultaneous display, activation, and/or operation of the various components, functions, features, and modules of server 100, described in association with at least FIG. 2, and/or operation of the various components, functions, features, and modules of user interface 200 or 300, 390 as later described in association with at least FIGS. 3, 5A, 5B respectively. Moreover, it will be understood that the features, functions, modules, and components of the server 100 can be arranged in different forms and groupings, and therefore each of server 100 are not strictly limited to the particular arrangement or groupings of functions illustrated in FIG. 2. Similarly, while described later, it will be further understood that the features, functions, modules, and components of the example user interface 200 (FIG. 3) or the example user interfaces 300 (FIG. 5A) or 390 (FIG. 5B) can be arranged in different forms and groupings, and therefore each user interface 200, 300, 390 is not strictly limited to the particular arrangement or groupings of functions illustrated in FIGS. 3, 5A, and 5B, respectively.

While in one example the features, function, modules, and/or components of a print service provider 22 and/or soft proof service provider 85 are at least partially embodied in a server (e.g. server 100) as described in association with FIG. 2, it will be understood that in another example of the present disclosure, at least some of the features, functions, modules, and/or components of the print service provider 22 and/or soft proof service provider 85 are provided via the cloud 60 via cloud computing resources provided via: (1) infrastructure as a service (IaaS); (2) platform as a service (PaaS); (3) software as a service (SaaS); or (4) a hybrid form of cloud-based services.

With references to FIGS. 1B and 2, in one example web site 80 comprises a site operated by print service provider 22 and accessible by at least print buyer 24, through which user interface 70 can be accessed. However, in other examples, user interface 70 is supplied via CD-ROM or communication protocols and/or environments other than web site 80.

With further reference to FIGS. 1B and 2, in one example web site 80 comprises a site operated by soft proof service provider 85 and accessible by at least print buyer 24, with web site 80 hosting the user interface 70 to be accessed. In this example, print service provider 22 contracts with soft proof service provider 85 to make user interface 70 and/or web site 80 available to print buyer 24 so that print service provider 22 and print buyer 24 can communicate aspects of the soft proof array 26 to each other.

In one example, via user interface 70 and/or web site 80, print service provider 22 enables buyer access to soft proof array 26.

In some examples, at least some portions of the soft proof array 26 are content-free or blank in that no text or graphics are present on the pages or covers. In other examples, at least some portions of the soft proof array 26 include portrayal of sample content that is not specific to the print buyer 24.

As previously mentioned, via user interface 70 a print buyer 24 accesses the soft proof array 26 to review and approve the soft proof array 26 before print service provider 22 proceeds with executing a print order. However, in at least some instances, as further described below, print buyer 24 modifies some aspects of the soft proof array 26 before print service provider 22 proceeds with executing the print order.

In some examples, server 100 includes a manager 120 (stored in memory 104) that operates in association with user interface 70 to regulate the interaction and relationship between print service provider 22 and print buyer 24. In one example, manager 120 includes a viewing conditions function 130 and threshold parameter 132. Viewing conditions function 130 acts to ensure that the characteristics of the device (and associated viewing conditions) through which print buyer 22 accesses and views soft proof array 26 meet a threshold parameter 132 of minimum viewing conditions. In some examples, a non-exhaustive list of such minimum or preferred viewing conditions includes the type or model of viewing device, a minimum display or monitory quality, recent calibration, lighting, sharpening, warm-up time, etc. In some examples, further viewing conditions include a maximum magnitude of error of the viewing device. In one example, at least some of the viewing conditions are consistent with soft-proofing industry protocols such as Specifications for Web Offset Proofing (SWOP), GRACol, and dMACS. Via threshold parameter 132, the print service provider 22 and/or soft proof service provider 85 determine which minimum viewing conditions will be applied to all buyers 24, to a particular buyer 24, and/or for particular soft proof arrays 26.

In some examples, manager 120 includes an access rights module 140 as shown in FIG. 2. In general terms, access rights module 140 controls viewer access to soft proof array 26 by regulating differential access to a print product (including a composite set of materials) for multiple participants along a workflow used to produce the print product.

In one example, the access rights module 140 controls viewer access according to an identity parameter 142 and a scope parameter 144. In particular, the identity parameter 142 subjects each person or entity (e.g. a buyer 24 or employee of the print service provider 22) attempting to access the soft proof array 26 to an authentication test before they become authorized to access the soft proof array 26. In one instance, user identity can be maintained on the system via public key infrastructure, lightweight directory access protocol (LDAP) server, identity based encryption infrastructure, etc.

Upon authentication of the identity of the viewer via identity parameter 142, the scope parameter 144 of the access rights module 140 authorizes the viewer to access content 156, any variations on the content 156, and/or content 156 services associated with that authorization. In general terms, t content 156 includes text 150, images 152, and/or graphics 154.

In some examples, scope parameter 144 provides different levels of access to the content of soft proof array 26. In particular, because there can be many different participants that access the soft proof array 26 during a workflow in producing a print product, the scope parameter 144 regulates the different levels of access (i.e. differential access) to the content along the workflow. In one example, a first access level enables viewer to access a template layout of soft proof array 26, including such factors such as a type of product (e.g. magazine, booklet, etc.), a type of binding, a type of substrate, etc.

In one example, a second access level includes the template layout and further includes generic content (images 152, text 150, and/or graphics 154) that is generally unrelated to the content of the actual print product. This level of access enables a viewer (e.g. an employee of the print buyer 24 or of the print service provider 22) to see and evaluate color components of the print product as well as spatial-structural components in context but without the actual content being revealed. In other words, generic text, images, or graphics may be substituted for the actual content to preserve the confidentiality or sensitive nature of the actual content. For example, the actual content could include details (e.g. features description, pictures, etc.) regarding an upcoming product release which the print buyer prefers not to be revealed prior to its intended date of release.

In another example, a third access level includes the template layout and the actual content (images 152, text 150, and/or graphics 154) of the print product. This level of access is reserved for those workflow participants that can be trusted not to reveal confidential or sensitive aspects of the actual content.

Accordingly, the different levels of access granted via access rights module 140 to the content can depend on the identity of the viewer and/or on the point in time at which the soft proof array 26 is being viewed. It will be further understood that the access rights module 140 is not strictly limited to three levels of access, but that fewer or more levels of access can be provided.

Moreover, one particular workflow participant may be granted a high level of access to a first portion of the content, but not granted any access to a second portion of the content while a second workflow participant is granted access to the second portion of the content but not to the first portion of the content. Accordingly, the different levels of access are not necessarily applied uniformly for all workflow participants nor applied uniformly for all content of a soft proof array for a print product.

FIG. 3 is a block diagram of a user interface 200, according to one example of the present disclosure. In one example, user interface 200 includes at least substantially the same features and attributes as user interface 70 as previously described in association with FIGS. 1B-2. As shown in FIG. 3, user interface 200 includes a display module 202 and a manager 220.

In one example, the display module 202 includes a visual product representation function 210 and a color array function 212. In this example, the soft proof array 26 includes a color component by which the print buyer 24 reviews and approves a soft proof according to color component(s) in the print product.

In one aspect, the visual product representation function 210 of display module 202 displays a visual representation of the print product based on a soft proof array 26 of a print product, as further illustrated later in association with FIG. 5A.

In another aspect, the display module 202 includes a color array function 212 that visually represents a color component of soft proof array 26. In particular, color array function 212 includes a tolerance range parameter 216 and a target color parameter 218. The target color parameter 218 provides a visual representation of a target color of a selected portion of the print product while tolerance range parameter 216 provides a visual color representation of the tolerance range for a particular color for a particular portion of the print product. FIG. 5A later illustrates just one example of a color array function 212 by which a target color and tolerance range are visually represented and form a portion of a soft proof array 26 for a particular print product.

In one example, user interface 200 includes and/or is supported by a manager 220. Moreover, in some examples, manager 220 includes at least substantially the same features and attributes as manager 120 as previously described in association with FIG. 2. As shown in FIG. 3, manager 220 includes a visualization function 230 controlling the manner by which the visual representation in display module 202 represents the print product. In one aspect, the features and elements appearing in the visual representation are determined according to a soft proof array function 232. In addition, manager 220 includes a tolerance selection function 240 by which the print buyer 24 expresses its acceptance (or modification) of a tolerance range for a particular color component of a print product according to the displayed soft proof appearing in the visual representation per display module 202.

In some examples, the visualization function 230 includes a switching mechanism or function to enable switching between different instances of the visualization of the print product to help a viewer evaluate the selected tolerance range. This switching function is further described later in association with at least FIG. 5A.

It will be further understood that in offering a soft proof array 26 for review by buyer 24, the print service provider 22 operates the tolerance selection function 240 to set the proposed range of tolerance for a particular color component of the print product (and its corresponding soft proof array 26).

In another example, the user interface 200 of FIG. 3 enables a print buyer 24 to assess a soft proof according to a color component function 250. As shown in FIG. 4, color component function 250 includes a hue parameter 252, a chroma parameter 254, and a lightness parameter 256. Accordingly, a tolerance range is reviewable, selectable, and modifiable according to each of the hue parameter 252, chroma parameter 254, and lightness parameter 256.

In some examples, all three of the hue, chroma, and lightness parameters 252, 254, 256 are selected such that the tolerance range is reviewed and adjustable for the combination of parameters 252, 254, 256. This mode is engaged by selecting all of the parameters 252, 254, 256 or selecting none of them.

In another example, the respective hue, chroma, lightness parameters are selected one-at-a-time, as further described below in association with FIG. 5A.

FIG. 5A is a diagram schematically illustrating a user interface 300, according to one example of the present disclosure. In one example, user interface 300 includes or incorporates at least substantially the same features and attributes as user interface 200 previously described in association with FIG. 3. As shown in FIG. 5A, user interface 300 includes a display portion 302 and an input portion 304 with dashed line 303 schematically representing a border between display portion 302 and input portion 304. It will be understood that, in some instances, input portion 304 also includes display features to enable selection, approval and/or modification of features of a soft proof array.

The display portion 302 includes a soft proof 310 provided as a visual representation of a portion of print product, such as the page 312 shown in FIG. 5A. Page 312 provides just one example of the features and components forming part of a page of a soft proof array 26. In one example, page 312 includes black text portions 320, color text portions 324, 326, 328, graphics portions 330, 332, and images 340, 342, 344, 346. Moreover, some elements include a combination of text and graphics, such as element 327 which includes a text portion 328 and a border 329 (e.g. a graphics feature).

While some pages of a print product need not include color, for illustrative purposes, it will be assumed that at least some of the graphics portions 330, 332, image portions 340, 342, 344, 345, and/or color text portions 324, 326 include colors.

In one example, at least one of the graphics portions (330, 332), image portions (340, 342, 344) and/or color text portions (324, 326) includes a process color group (color components to be reproduced with Cyan (C), Yellow (Y), Magenta (M), and Black (K) inks).

In another example, at least one of the graphics portions (330, 332), image portions (340, 342, 344) and/or color text portions (324, 326) includes a spot color, such as a Pantone spot color.

In some examples, multiple portions of page 312 include the same spot color, such that any changes in a tolerance range of the spot color affects all the portions of the page 312 that include that spot color. For instance, the graphics portion 330 (e.g. HP logo) and the color text portion 324 could both include the same spot color and therefore comprise a spot color group for page 312 (and print product as a whole). Upon application of selector tool 352 on either the graphics portion 330 or the color text portion 324, the user will be selecting or adjusting the tolerance range for each element (e.g. graphics portion 330 and color text portion 324) belonging to that spot color group.

Similarly, in another example, any change in the tolerance range for a selected portion of page 312 of the print product based on a process color group will cause a corresponding change in other portions of the page 312 based on the same process color group.

In one example, the visualization function 230 includes a select-all parameter such that all portions (whether image, graphics or text) that belong to a selected spot color group or process color group will be highlighted to enable the user to visualize the tolerance range (and changes to the tolerance range) simultaneously for all those portions of page 312 belonging to the respective selected spot color group or process color group.

In one example, via user interface 300, manager 200 enables changes in a tolerance range to an entire process color group, but does not permit adjustments to a tolerance range for just a single color component in that process color group.

Moreover, multiple different process color groups can be defined. For example, some process color groups include color components to be reproduced with more than four inks, such as Cyan, Magenta, Yellow, Black, Orange and Violet (CMYKOV).

While not forming part of page 312, display portion 302 displays a pointing tool 352, which may take the form of a window, icon, etc. and which allows a user to identify a particular portion of a page to examine more closely regarding a target color and color tolerance.

As further shown in FIG. 5A, input portion 304 includes an input mechanism 360 for viewing and selecting a color tolerance. As shown in FIG. 5A, input portion 304 comprises a color input portion 362, which includes display of a color array 371 having a target color 370, a first end 372 of a color tolerance range, and a second color 374 of a color tolerance range. While FIG. 5A is shown in black and white due to Patent Office rules for drawings, it will be understood that in practice elements 370, 372, 374 would appear as color portions. In another aspect, color input portion 362 includes a lightness parameter 366, a hue parameter 367, and a chroma parameter 368 which are visual expressions of the corresponding lightness parameter 252, hue parameter 254, and chroma parameter 256 previously described in association with FIG. 4. As further shown in FIG. 5A, one of these parameters 366, 367, 368 is selected (e.g. lightness parameter 366) to determine which of these parameters is displayed in color array 371.

Moreover, color input portion 362 includes a tolerance selector tool 380 which includes a tolerance scale 382 having a first end 385 and an opposite second end 386, thereby defining the possible range of color tolerance (according to at least one of the lightness, hue, and chroma parameters) for the selected portion of page 312. Accordingly, the first end 385 of scale 382 represents a minimum color tolerance range and the second end 386 of the scale 382 represents a maximum color tolerance range. Tolerance selector tool 380 includes a slider 384 which enables selecting the tolerance range along scale 382. Given a position of the slider 384 that selects a particular tolerance range, the first color sample 372 represents a lower end of that selected tolerance range while the second color sample 374 represents an upper end of the selected tolerance range.

In one example, the tolerance range is captured via the expression Delta E in the CIE 1976 L*a*b* color space. Alternatives are Delta L*, Delta C or Delta H.

In one example, as further shown in FIG. 5A, input portion 304 of user interface 300 includes pointing tool function 354, which controls pointing tool or window 352 appearing in display portion 302. Upon activation of pointing tool function 354, a user can maneuver pointing tool 352 about page 312 using navigation capabilities implemented via a touch screen, a mouse, or other known navigation-equipped input mechanism cooperable with a graphical user interface. In one aspect, pointing tool function 354 enables adjusting the size and/or shape of the pointing tool 352 to fine tune identification of the portion of page 312 for which color tolerance will be considered.

In one example, input portion 304 includes a switching function 378 as shown in FIG. 5A. In general terms, switching function 378 enables switching between different instances of the visualization of the print product. In one aspect, one of the instances of visualization of the print product corresponds to the target color of a color component and the other instances of visualization of the print product correspond to different points along the selected tolerance range for that color component. Via switching function 378, the viewer can switch or toggle between at least two different instances of visualization of page 312 of the print product in display portion 302 to further enable their evaluation of the selected tolerance range relative to the target color for that print product.

In another example, the switching function 378 is equipped to enable switching or toggling between different instances of visualization of a print product for a tolerance range of a spatial-structural component of the soft proof array for a print product.

In one example, input portion 304 also includes additional mechanisms to alter the appearance of portions of the print product in visual representation displayed in display portion 302. In particular, in some embodiments, input portion 302 includes a media function 356, an ink function 357, and a printer function 358. These functions 356, 357, 358 enable a buyer 24 and/or print service provider 22 to review and/or modify an appearance of a portion of a soft proof visual representation (and therefore the print product) according to a type of media per media function 356, a specific ink set per ink function 357, and/or a type of printer (or printer technology) per printer function 358.

Figure 7A:
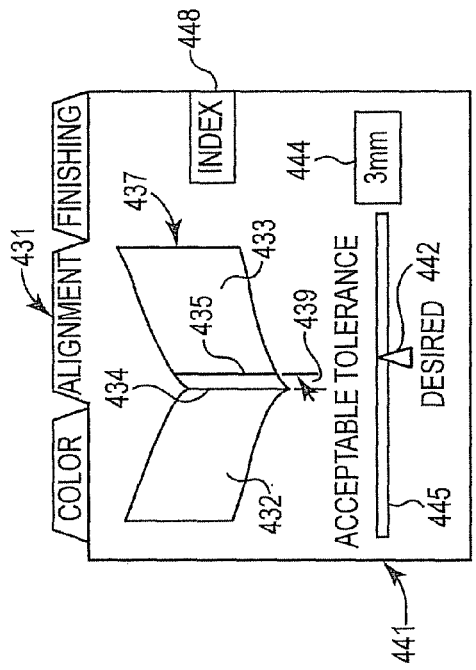
FIG. 7A is a diagram schematically illustrating a display-and-input module including a tolerance selector for an alignment component, according to one example of the present disclosure.
Figure 7B:
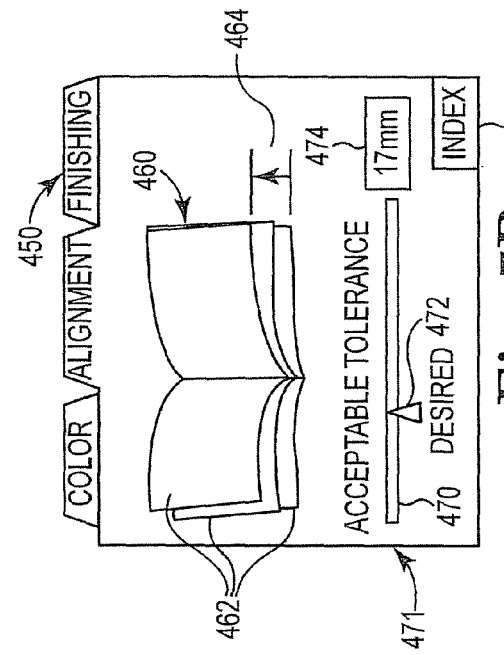
FIG. 7B is a diagram schematically illustrating a display-and-input module including a tolerance selector for a finishing component, according to one example of the present disclosure.
Figure 6:
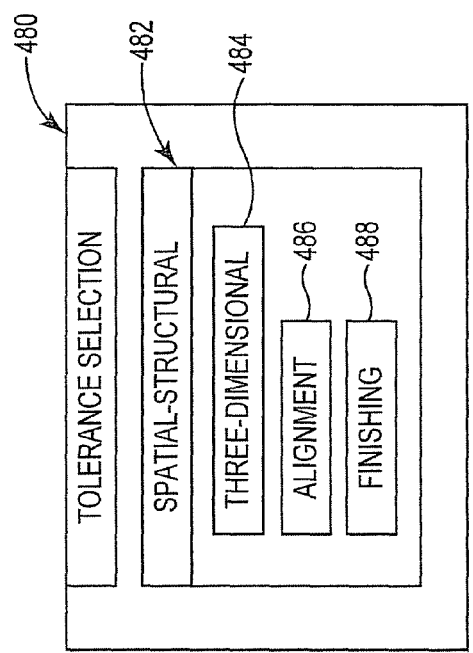
FIG. 6 is a block diagram schematically illustrating a tolerance selection module including a spatial-structural module, according to one example of the present disclosure.

In one example, as further shown in FIG. 5A, input portion 304 of user interface 300 includes input tools for viewing and/or modifying spatial-structural components of a soft proof array 26 associated with a print product, and which are further described and illustrated in association with at least FIGS. 6-7B.

Figure 5B:
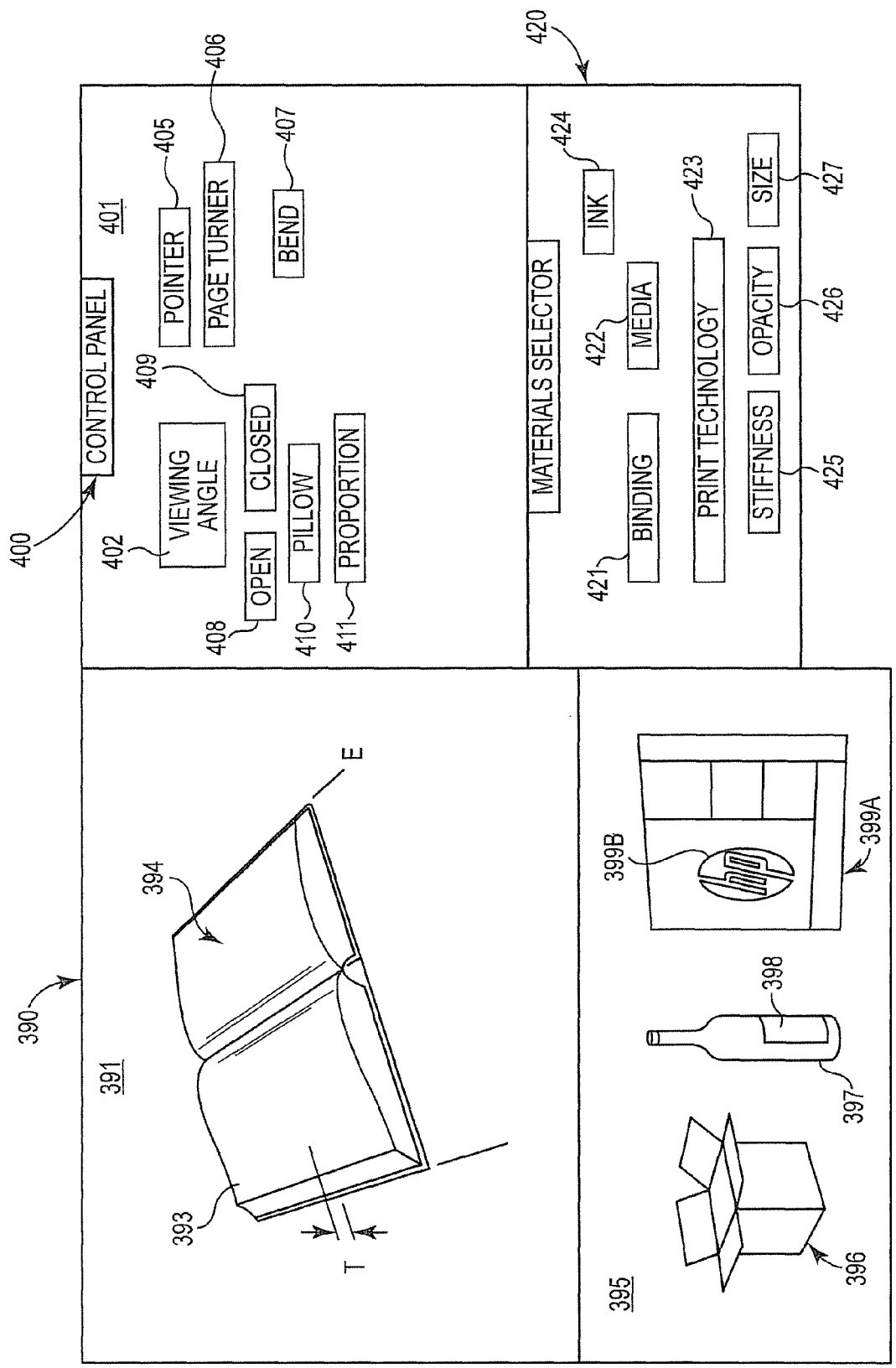
FIG. 5B is a diagram schematically illustrating a user interface, including a general display portion and an input portion, to interact with spatial-structural components of a print product, according to one example of the present disclosure.

FIG. 5B is a diagram schematically illustrating a user interface 390, according to an example of the present disclosure. In general terms, user interface 390 is cooperable with and/or complements user interface 300 of FIG. 5A. In general terms, user interface 390 enables a print service provider 22 and/or buyer 24 to view, alter, and/or approve spatial-structural features, elements, and components of a print product. As shown in FIG. 5B, user interface 390 includes a display portion 391 and an input portion 401 (e.g. embodied in control panel 400). The display portion 391 displays a three-dimensional visual representation of a print product 394, such as a bound book as shown in FIG. 5B. The print product 394 includes a plurality of pages 393.

In one example, user interface 390 includes a selectable library 395 of different types of print products, such as but not limited to, a container 396, a bottle 397 with label 398, and signage 399A (with icon 399B).

In general terms, as shown in FIG. 5B, input portion 401 includes a number of functions to enable a print service provider 22 or buyer 24 to manipulate the appearance of the print product 394 in display portion 391 to evaluate how the print product would appear and function. In one example, input portion 391 includes a viewing angle function 402 and a page turner function 406, which enable selecting an angle from which to view the print product and enable turning the pages of the print product, respectively. A pointer function 405 enables identifying portions of the print product 394 to be inspected more closely or to identify which portion of the print product 392 to which another function will be applied. In some examples, other functions of input portion 401 include a bend function 407, an open function 408, and a closed function 409. These functions enable a viewer to visualize in display portion 391 the bending of a portion of a print product or in the case of a bound print product, to visualize in the display portion, viewing the print product in an open state or a closed state. For instance, as shown in FIG. 5B, print product 394 is shown in an open state per open function 408. Finally, in other examples, input portion 401 includes a pillowing function 410 and a proportion function 411. These functions further enable viewing and manipulation of print product 394 according to any pillowing behavior or a relative proportion of different portions of print product 394$1n$ one example, the proportion function 411 tracks an appearance of the pages of a book relative to the cover, such as whether a booklet or book looks relatively thick or thin given a particular size (e.g. 8.5×11 or 4×6) of the print product.

In another aspect, the functions 402-412 in input portion 401 do not comprise an exhaustive list or grouping of all the functions that can be used to view and manipulate portions of a print product, in accordance with a soft proof array. Rather, functions 402-412 provide examples of some of the ways that a buyer can view (and interact with) a print product via a visual representation associated with a soft proof array 26 to enhance the confidence level of the buyer and of the print service provider 22 that the print product will be acceptable when delivered.

In one example, the user interface 390 includes a materials selector module 420 as shown in FIG. 5B. In general terms, the materials selector module 420 enables a viewer to visualize, via display portion 391, how the appearance and/or function of a print product 394 will behave depending on the materials used to build the print product 394. In one example, materials selector module 420 includes a binding parameter 421, a media parameter 422, and an ink parameter 424, and a printing technology parameter 423. In use, these parameters 421-424 enable a viewer to evaluate how the appearance of a print product changes, per a soft proof array 26, according to the respective binding, media, ink, and printing technology parameters.

In another example, the appearance of the print product 394 in the visual representation of display portion 391 (according to soft proof array 26) is further manipulable via a stiffness parameter 425, an opacity parameter 426, and a size parameter 427 to adjust a stiffness, opacity, or size of one of the materials used to construct the print product 394. It will be understood that these parameters 425-427 are examples, and not an exhaustive list, of various materials parameters that can be changed to alter the appearance and performance of a print product and that can be captured in a soft proof array 26.

It will be understood that manipulation of various parameters within a soft proof array 26, such as the media parameter 422 or stiffness parameter 425, generally implicates the specifications, features and behaviors of actual materials used to build a print product. Accordingly, changing a value of one parameter might dictate that a different material be used or selecting a particular media might cause a corresponding change in various other parameters (e.g. stiffness, opacity, size, etc.).

FIG. 6 is a block diagram of a tolerance selection tool 480, according to an example of the present disclosure. As shown in FIG. 6, tolerance selection tool 480 includes a spatial-structural module 482, which in general terms enables a print buyer 24 to view and select tolerances for spatial-structural components and features of a print product. In one example, spatial-structural module 482 includes a three-dimensional feature function 484, an alignment function 486 and a finishing function 488. The three-dimensional feature function 484 enables a print buyer to identify three-dimensional features of a print product for consideration in selecting and reviewing tolerances.

In one example, such three-dimensional features include an alignment of portions of a print product, and which are managed via alignment function 486. One example of the operation of alignment function 486 is further described and illustrated in association with FIG. 7A.

In another example, another three-dimensional feature includes a finishing element of a print product, which is managed via finishing function 488. One example of the operation of finishing function 488 is further described and illustrated in association with FIG. 7B.

FIG. 7A is a diagram schematically illustrating an alignment input mechanism 431 of a user interface, according to one example of the present disclosure. As shown in FIG. 7A, alignment input mechanism 431 includes a visual representation of a print product 437. In the illustrated example, print product 437 includes pages 432, 433 separated by a fold or crease 434. As shown in FIG. 7A, an edge 435 of content (e.g. images, text, and/or graphics) intended to appear on page 432 has extended beyond fold 434 to appear on part of page 433. In addition, the alignment input mechanism 431 includes a tolerance tool 439 which visualizes the effects of alignment tolerances e.g. the extent to which the content from page 432 extends beyond fold 434.

In another aspect, alignment input mechanism 431 includes a tolerance selector tool 441 having a scale 445 illustrating the full range of potential alignment distances which can be tolerated. Marker 442 identifies the currently selected and illustrated degree of tolerance (e.g. 3 mm) proposed by the print service provider 22 and/or acceptable to the print buyer 24. In one example, using tools customary to a graphical user interface, marker 442 is slidable into a desired position along scale 445. In another aspect, the currently selected and displayed tolerance range (e.g. 3 mm) is displayed in numerical terms via display window 444.

As shown in FIG. 7A, in one example, alignment input mechanism 431 includes a menu or index 448 for the print product to enable the print buyer 24 (or print service provider 22) to select which alignment feature of a print product is displayed and managed via alignment input mechanism 420.

FIG. 7B is a diagram schematically illustrating a finishing input mechanism 450 of a user interface, according to one example of the present disclosure. As shown in FIG. 7B, finishing input mechanism 450 includes a visual representation of a print product 460. In the illustrated example, print product 460 includes multiple pages 462 bound together as a book, magazine, or pamphlet. When placed into an open position, the outer edges of the pages 462 are spaced apart from each other, which is sometimes referred to as a fanning behavior. This fanning behavior is just one example of several finishing elements of a print product.

As shown in FIG. 7B, the finishing input mechanism 460 includes a tolerance visualization tool 464 which highlights the extent (e.g. height) by which the pages 462 exhibit the fanning.

In another aspect, alignment input portion 450 includes a tolerance selector tool 471 including a scale 470 illustrating the full range of potential fanning distances which can be tolerated. Marker 472 identifies the currently selected and illustrated degree of tolerance (e.g. 17 mm) proposed by the print service provider 22 and/or acceptable to the print buyer 24. In one example, using tools customary to a graphical user interface, marker 472 is slidable into a desired position along scale 470. In another aspect, the currently selected and displayed tolerance range (e.g. 17 mm) also is displayed in numerical terms via display window 474.

As shown in FIG. 7B, in one example the finishing input mechanism 450 includes a menu or index 476 to enable the print buyer 24 (or print service provider 22) to identify which particular alignment feature of print product is displayed and managed via finishing tolerance input mechanism 450.

Figure 8:
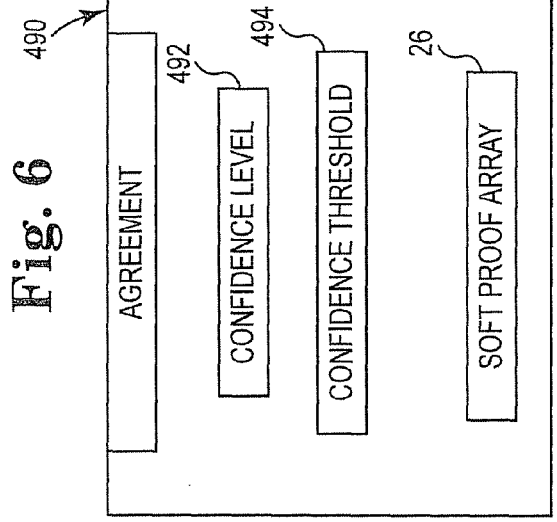
FIG. 8 is a block diagram schematically illustrating an agreement module, according to one example of the present disclosure.

FIG. 8 is a block diagram of an agreement module 490, according to one example of the present disclosure. In general terms, the agreement module 490 manages an interaction and relationship between the print service provider 22 and the print buyer 24 regarding whether a soft proof array 26 will define an agreement, guarantee, and/or contract governing the printing of a print product according to the tolerances expressed in the soft proof array 26.

As shown in FIG. 8, in one example the agreement module 490 includes a confidence level parameter 492, a confidence threshold parameter 494, and a soft proof array 26. The confidence level parameter 492 tracks a confidence rating by the print buyer 24 and a confidence rating by the print service provider 22 regarding the ability of the soft proof array 26 to sufficiently result in an acceptable print product. The confidence threshold parameter 494 is set by the print service provider 22 to represent a minimum level of confidence before the soft proof array 26 can serve as an agreement, guarantee or contract and the print service provider 22 will execute the print order for the print product.

Figure 9:
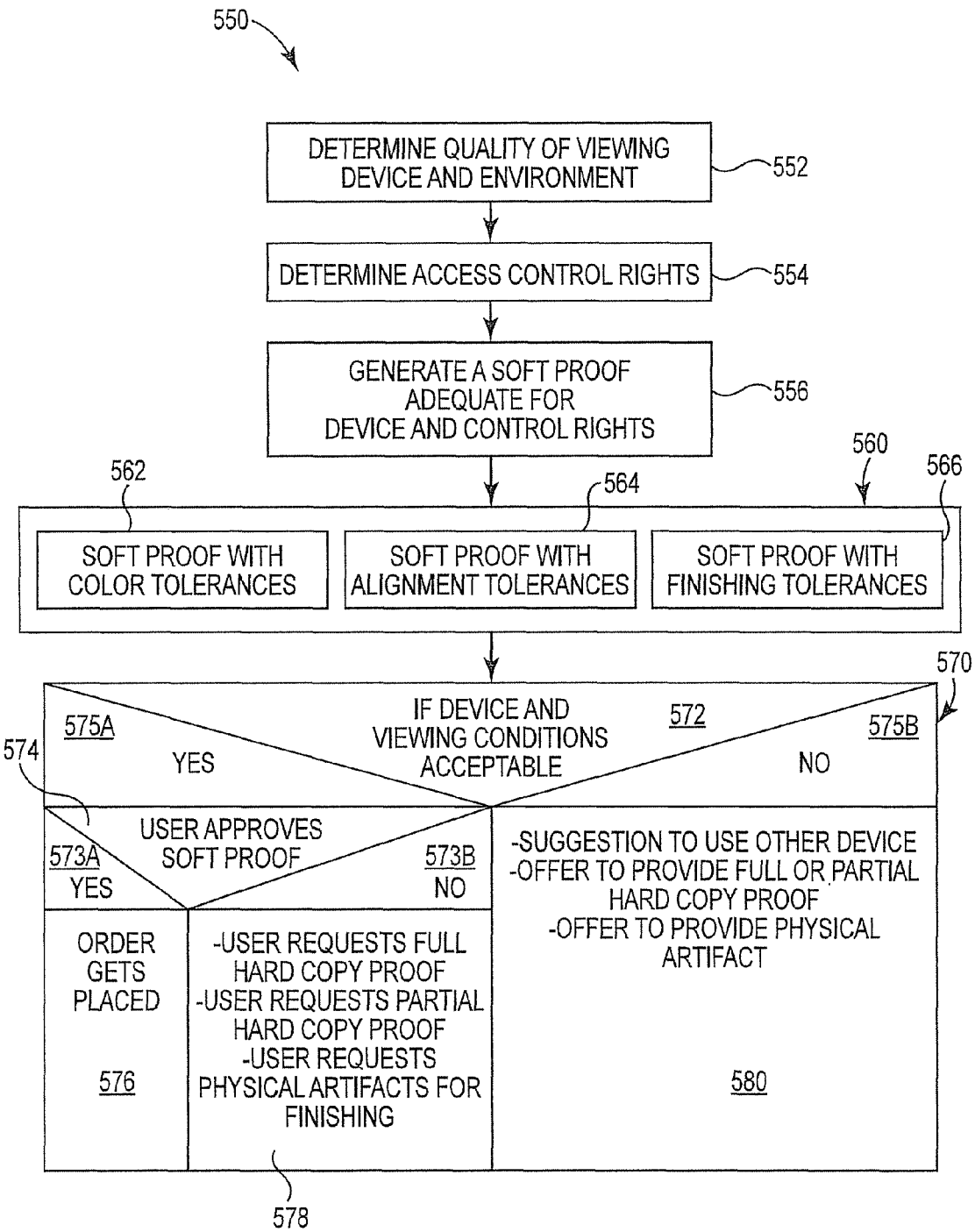
FIG. 9 is a diagram schematically illustrating a method of producing a soft proof array, according to an example of the present disclosure.

FIG. 9 is a diagram schematically illustrating a method 550 of reviewing a soft proof array, according to an example of the present disclosure. As shown at 552 in FIG. 9, method 550 includes determining a quality of the viewing device and viewing environment in which the print buyer 24 is viewing the soft proof array. If the device meets the criteria set by the print service provider 22, such as via threshold 132 in association with viewing conditions function 130 previously described in association with FIG. 2, then the print service provider 22 permits the buyer 24 to approve the soft proof array 26. In one example, if the print service provider 22 determines that the applicable device and environment do not meet threshold 132 (FIG. 2), the viewing conditions function 130 (FIG. 2) notifies the buyer 24 that while the soft proof array 26 can be viewed, the buyer is not eligible to approve or disapprove the soft proof array 26 with the current viewing device and/or under the current viewing conditions.

In some instances, viewing conditions function 130 makes recommendations to print buyer 24 about how to meet the threshold 132.

In another example, if the print service provider 22 determines that the applicable device and environment do not meet threshold 132 (FIG. 2), the viewing conditions function 130 (FIG. 2) notifies the buyer 24 that the soft proof array 26 cannot be viewed with the current viewing device and/or under the current viewing conditions.

Assuming that the viewing conditions are met, method 550 includes print service provider 22 (or soft proof service provider 85) determining the identity of the buyer 24 (per identify function 142 in FIG. 2) and then determines what, if any, access level is given to the buyer 24 regarding the content of the print product via the soft proof array 26, as shown at 554 in FIG. 9.

In other examples, it is the print buyer 24 that controls what level of access that the print service provider 22 (or soft proof service provider 85) receives toward the content of a soft proof array 26 and its associated print product. In some instances, the level of access provided to the print service provider 22 is dependent on whether a contract or agreement has been made between the buyer 24 and the print service provider 22, whereby the agreement ensures confidentiality by the print service provider, so that more access is given to the content in the print product and soft proof array 26.

With this in mind, at 556 in FIG. 9, method 550 generates a soft proof array 26, including a visual representation of the print product, suitable for the viewing device and with a scope of content appropriate for the granted level of access.

At 560, a soft proof array 26 is established and produced according to various components, such as a color component 562 and/or spatial-structural components, such as alignment component 564 and/or finishing component 566. Once the tolerance range is selected by the print buyer for components 562-566, method 550 confirms whether the device and environment of the buyer 24 provide sufficient conditions to view, adjust, and approve the proposed soft proof array 26.

If the query is answered affirmatively (e.g., YES) as at 575A, then the print service provider 22 enables the user to approve or disapprove of the soft proof array 26, as at 573A or 573B. Upon approval, the print order is placed as shown at 576 of FIG. 9. However, if the soft proof array 26 is not approved, then at 578 method 550 includes the buyer: (1) requesting a full Hard Copy proof; (2) requesting a partial Hard Copy proof; or (3) requesting physical artifacts regarding the finishing components of the print product according to the soft proof array 26.

On the other hand, if the device and environment provide unsuitable viewing conditions in view of the proposed soft proof array 26 (e.g. answer is NO at 575B), then the print service provider 22 suggests that print buyer 24 uses another viewing device and/or alters the environment in which the soft proof array 26 is viewed, as shown at 580. Alternatively, the print service provider 22 offers to provide a full or partial Hard Copy proof of the print product and/or offers to provide a physical artifact (e.g. regarding a spatial-structural feature), as further shown at 580.

In one common situation, a print buyer creates and formats elements of a print product. In doing so, the print buyer may not account for all the factors appropriate for achieving a high quality result. In just one example, in preparing a layout of print product(s) when submitting a print job, the print buyer may not adequately plan for various finishing steps such as cutting.

Figure 10B:
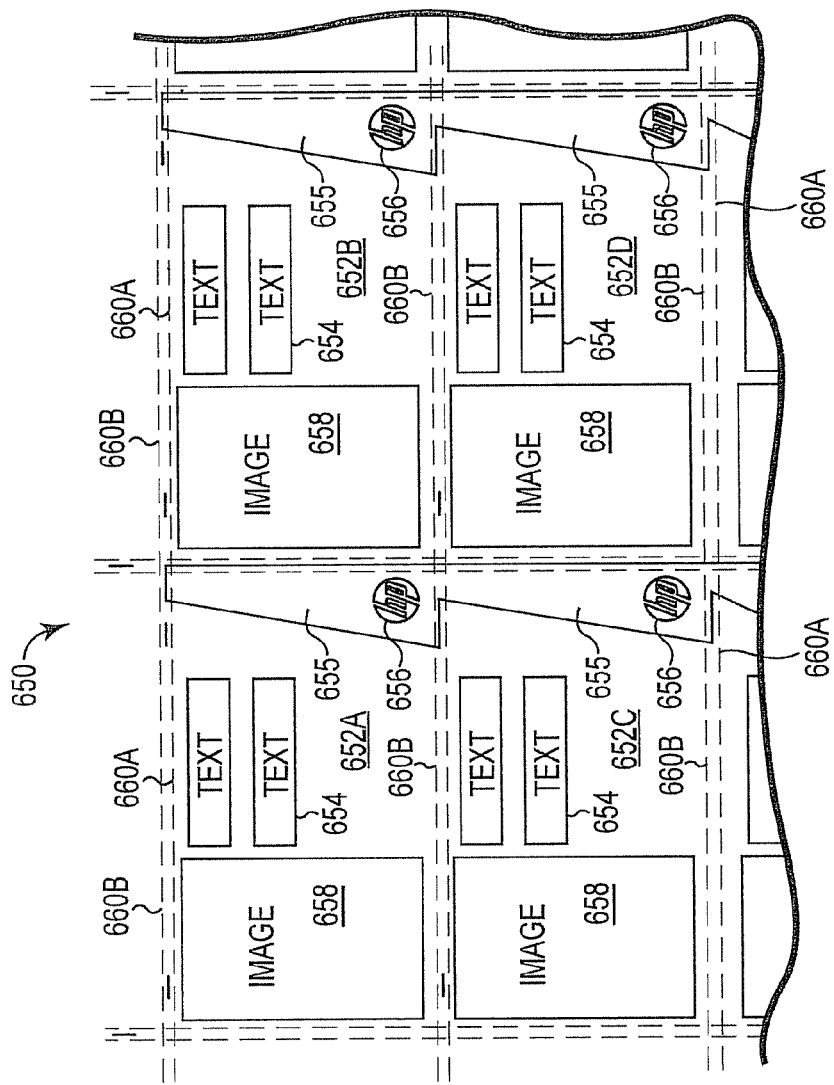
FIG. 10B is a diagram schematically illustrating a portion of a print product, according to an example of the present disclosure.
Figure 10A:
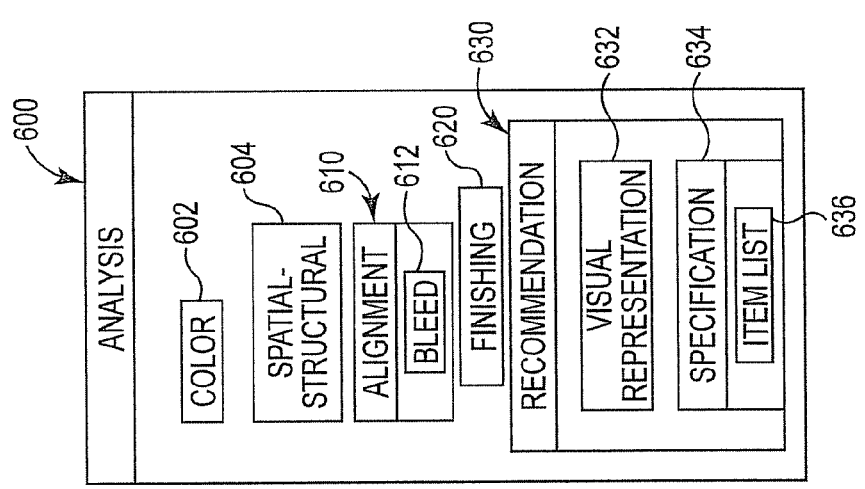
FIG. 10A is a block diagram schematically illustrating an analysis-and-recommendation module, according to an example of the present disclosure.

FIG. 10A is a block diagram of an analysis module 600, according to an example of the present disclosure. In general terms, the analysis module 600 automatically analyzes a soft proof array 26 of a print product to determine what, if any, aspects of the print product might be problematic if not corrected. As shown in FIG. 10A, analysis module 600 analyzes color components 602 and spatial-structural components 604 of a print product. In just one example, an analysis module 600 could analyze various alignment criteria and alignment features of a print product, such as bleed via a bleed parameter 612, which is just one example of an alignment feature. In one example other spatial-structural components are examined, such as finishing features via finishing function 620. FIG. 10A also illustrates a recommendation module 630, which will be further described below. FIG. 10B is a diagram schematically illustrating a print product, such as a sheet 650 of business cards 652 that have not yet been separated from each other. In this example, a print buyer created the sheet 650 by replicating the same business card 652 on a single sheet to create a grid or array of business cards 652. As shown in FIG. 10B, the business cards 652 are arranged on a sheet in rows and columns such that the cards 652 are generally uniformly spaced apart. As an example, each business card 652 includes text portions 654, graphic 655 including logo 656, and an image 658. Even though each business card is generally identical in appearance and size, for illustrative purposes each different business card in sheet 650 includes a letter designation (e.g. A, B, C, etc.) to facilitate discussion of alignment issues in relation to analysis module 600.

FIGS. 10C-10D are enlarged views of a portion of sheet 650 of FIG. 10B. Assuming perfect alignment takes place relative to an automatic cutter, cutting would occur at lines 672 on sheet 650 between the respective business cards 652. Cutting along lines 672 would ensure that each business card 652 neither includes extra portions nor omits intended portions. However, in practice such perfect alignment does not take place, and with an example cutting tolerance of 0.1 inches, the cutting might actually take place between dashed lines 660A and 660B (variance in top-to-bottom alignment within 0.1 cutting tolerance) and/or between dashed lines 661A and 661B (variance in left-to-right alignment within the example 0.1 inch cutting tolerance), as shown in FIGS. 10C-10D.

In the instance in which the cut occurred along dashed line 660B, the top portion of business card 652C would undesirably include a lower portion 657 of the graphic 655 of business card 652A, as shown in FIG. 10C. Accordingly, the lower portion of business card 652A (and therefore the lower portion 657 of graphic 655) would be undesirably truncated while the upper portion of business card 652C would be undesirably enlarged by incorrectly including the lower portion 657 of graphic 655 of business card 652A. In another instance, in which one of the cuts occurs along line 661B, the right portion of business card 652A would include a white border 663 instead of having a right side 659 of its graphic portion 655 extend all the way to the intended right edge of the cut card 652A.

In terminology common in the industry, this print product lacks bleed at the edges of the business card. With this in mind, upon automatically examining a file corresponding to the sheet 650 of business cards 652, analysis module 600 automatically recognizes the predictable alignment errors in cutting business cards 652 from sheet 651 and, via recommendation module 630, recommends that bleed be applied to the business cards 652 of sheet 651.

Upon application of bleed, in this non-limiting example each business card will be enlarged by about 0.25 inches larger on each side (e.g. top, bottom, left edge, right edge) such that, even with a cutting tolerance of 0.1 inches, the cut business cards 652 will not include any portion of an adjacent business card in the sheet and each cut business card will include all its intended portions.

Moreover, in some examples, the recommendation module 630 causes a visual representation of print product 650 to be displayed (e.g. in display portion 302 of user interface 300) upon implementation of the appropriate bleed.

As further shown in FIG. 10A, in one example, recommendation module 630 provides a specification function 634 to produce and communicate (to buyer 24 and/or print service provider 22) via an item list 636 what elements and features of a print product should be altered to produce an acceptable print product. In some examples, these changes can be automatically implemented to the visual representation of the soft proof array 26 so that the buyer 24 and/or print service provider 22 can view the recommended change, which can be accepted or rejected.

It will be understood that the analysis tools of analysis module 600 can be applied to many other aspects of a soft proof array 26 of a print product. In one instance, such as the example shown in FIG. 7A, the analysis module 600 would automatically recognize that the content from page 432 extends beyond the crease or fold 434 and make a recommendation that either the tolerances need to be set to a lower level or the submitted print product needs to be changed.

Figure 11:
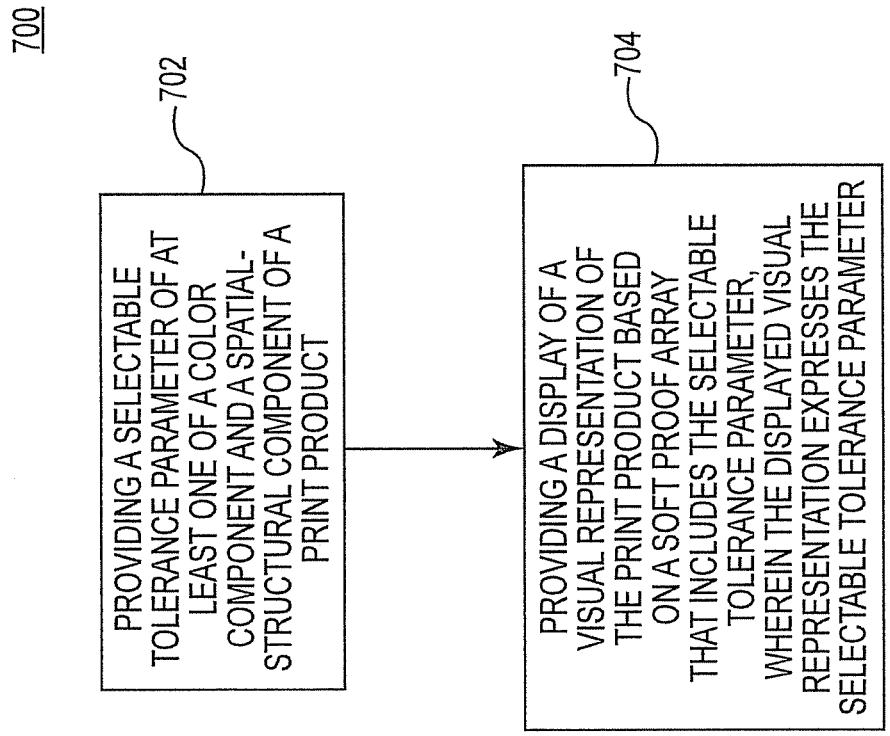
FIG. 11 is a flow diagram of a method of visually representing a print product according to a soft proof array, according to an example of the present disclosure.

FIG. 11 is a flow diagram of a method 700 of providing a soft proof array, according to an example of the present disclosure. In one example, method 700 is performed using the systems, components, functions, and modules as previously described in association with FIGS. 1-10B. As shown in FIG. 10, method 700 includes providing a selectable tolerance parameter of at least one of a color component and a spatial-structural component of a print product, as at 702. As shown at 704 in FIG. 11, method 700 further includes providing a display of a visual representation of the print product based on a soft proof array that includes the selectable tolerance parameter, wherein the displayed visual representation expresses the selectable tolerance parameter.

At least some examples the present disclosure are directed to a soft proof system that provides a visual representation of a print product according to a soft proof array, thereby enhancing a print buyer's review and evaluation of a soft proof of a print product. Unlike a traditional static soft proof that does not reveal the tolerances associated with it, a soft proof array according to embodiments of the present disclosure displays a target color (or other aspect such as alignment) while also displaying a tolerance range associated with the target color. Besides being able to visually evaluate the tolerance range, the system equips the buyer to modify and view adjustments to the tolerance range before approving the soft proof array. In other examples, the soft proof system also provides a visual representation of spatial-structural components of a print product according to a soft proof file, as well as the ability to visualize and adjust a tolerance range for those spatial-structural components, such as alignment or finishing elements of the print product.

Although specific examples and embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein.

What is claimed is:

1. A print service provider comprising:
a portal electronically accessible by a print buyer, the portal including:
a display module to display:
a visual representation of a print product; and
a color array expressing a tolerance range of a color component of the visual representation and a target color within the range;
a manager including:
a visualization function to produce the visual representation and the color array according to a soft proof array; and
a tolerance selection function associated with the display to enable selection of the tolerance range for at least a portion of the print product, wherein the selected tolerance range is expressed on the display in the visual representation and in the color array, and wherein the selected tolerance range is stored as a portion of the soft proof array;
an input mechanism, in communication with and associated with the display module, to select portions of the visual representation and to adjust the tolerance range for the color component of the selected portion, wherein the display expresses the adjusted tolerance range in the visual representation generally simultaneous with the adjustment; and
at least one printer in communication with the portal to produce the print product, according to the soft proof array, after engagement of the print buyer with the display module and the manager.

2. The print service provider of claim 1, wherein the tolerance selection function enables selection of a tolerance range of a spatial-structural component of the visual representation, wherein the soft proof array tracks, and the visual representation expresses, adjustments to the tolerance range of the spatial-structural component.

3. The print service provider of claim 1, wherein the color component includes a hue parameter, a chroma parameter, and a lightness parameter, and wherein the tolerance selection function includes a tolerance range for each of the respective hue, chroma, and lightness parameters.

4. The print service provider of claim 1, comprising:
a switching mechanism to enable switching between different instances of the visualization of the print product with one instance corresponding to the target color and at least one instance corresponding to a point along the selected tolerance range.

5. The print service provider of claim 1, wherein the tolerance selection function includes a confidence parameter to define a confidence level according to the adjusted tolerance range of the color components of the visual representation, and wherein the soft proof array defines at least a portion of a service level agreement when the confidence level exceeds a confidence threshold.

6. The print service provider of claim 1, wherein the manager includes:
a viewing threshold function to automatically determine device characteristics and associated viewing conditions and to determine eligibility to approve a soft proof array based on whether the determined device characteristics and associated viewing conditions meet a threshold set by the viewing threshold function.

7. The print service provider of claim 1, wherein the manager includes:
an access rights function to determine a scope of content to be displayed on the display module based on an identity of a viewer of the display, wherein the access rights function includes at least a first access level in which at least a portion of the content is omitted and a second access level in which the respective portion of the content is present, wherein the content comprises at least one of a text, images, and graphics.

8. The print service provider of claim 7, wherein the second access level provides the content as generic content when the identity of the viewer falls within a first class of viewer and as actual content when the identity of the viewer falls within a second class of viewer.

9. The print service provider of claim 1, wherein the manager includes:
an analysis module to automatically analyze at least a spatial-structural component of the soft proof array to identify deficiencies relative to spatial-structural criteria and to automatically recommend modifications, based on the deficiencies, to the print product per the soft proof array.

10. The print service provider of claim 1, wherein the color component is defined by at least one of a process color group and a spot color group, and wherein changes to the tolerance range for the color component affect all color components of the print product defined by that same respective process color group or spot color group.

11. The print service provider of claim 1, wherein the portal is provided via a soft proof service provider in communication with the print service provider, wherein the soft proof service provider is separate from, and independent of, the print service provider.

12. A print service system comprising:
   a server including a non-volatile memory to store, and a processor to execute, machine readable instructions to provide:
      a display module to display a visual representation of a print product; and
      a manager including:
         a visualization function to render the visualization representation according to an adjustable soft proof array; and
         a tolerance function to enable adjustment of a first tolerance parameter of a color component of the visual representation and adjustment of a second tolerance parameter of a spatial-structural component of the visual representation, wherein the soft proof array tracks, and the visual representation expresses, adjustments to the respective first and second tolerance parameters.

13. The system of claim 12, wherein the spatial-structural component is expressed in the visual representation via three-dimensional features and wherein the spatial-structural component includes at least one of an alignment parameter and a finishing parameter.

14. The system of claim 12, wherein the server includes a non-volatile memory to store, and a processor to execute, machine readable instructions to provide:
   an input module to enable modification of a portion of the spatial-structural component and the display module to display the modified portion of the spatial-structural component generally simultaneous with the modification.

15. The system of claim 12, wherein the input module includes at least one of a materials selector module to enable user modification of a materials parameter of the spatial-structural component of the print product and to cause the display portion to modify the visual representation to express the modified materials parameter.

16. The system of claim 12, wherein the manager includes:
   an analysis module to automatically analyze at least a spatial-structural component of the soft proof array to identify a deficiency relative to a soft proof criteria and to automatically recommend modifications, based on the deficiency, to the print product per the soft proof array.

17. The system of claim 16, wherein the spatial-structural component includes an alignment parameter, and wherein the deficiency includes a mismatch between a content portion and an edge of the print product.

18. The print service system of claim 12, comprising:
   at least one printer, in communication with the server, to produce the print product according to the soft proof array, after user engagement with the display module and the manager.

19. The print service system of claim 12, wherein the print service system includes a soft proof service provider.

20. A method of providing a print product display comprising:
   providing a non-volatile memory to store, and a processing resource to execute, machine readable instructions to cause:
      providing a display of a visual representation of a print product according to a manipulable soft proof array; and
      providing a selectable tolerance parameter of at least one spatial-structural component of the visual representation, wherein the soft proof array includes the selected tolerance parameter of the spatial-structural component and the visual representation expresses the selected tolerance parameter of the at least one spatial-structural component via at least one three-dimensional feature.

21. The method of claim 20, wherein the display module includes an input mechanism to receive commands to select portions of the visual representation and to adjust the tolerance parameter for the respective color and structural feature components of the selected portion, wherein the display expresses the adjusted tolerance parameter in the visual representation generally simultaneous with the adjustment.

22. The method of claim 20, wherein providing the selectable tolerance parameter includes providing a confidence parameter to define a confidence level according to the selected tolerance parameter of the respective components of the soft proof array, and defining the soft proof array to include at least a portion of a service agreement when the confidence level exceeds a confidence threshold.

23. The method of claim 20, comprising:
   arranging at least one printer, in communication with the memory and the processing resource, to produce the print product according to the soft proof array.

* * * * *